US012120988B2

(12) United States Patent
Palumbo

(10) Patent No.: US 12,120,988 B2
(45) Date of Patent: Oct. 22, 2024

(54) PLANT CUTTING AND CLONE-GROWTH DEVICE AND RELATED METHODS

(71) Applicant: Antonio Palumbo, Saint-Lin-Laurentides (CA)

(72) Inventor: Antonio Palumbo, Saint-Lin-Laurentides (CA)

(73) Assignee: Antonio Palumbo, Saint-Lin-Laurentides (CA)

( * ) Notice: Subject to any disclaimer, the term of this patent is extended or adjusted under 35 U.S.C. 154(b) by 79 days.

(21) Appl. No.: 17/244,297

(22) Filed: Apr. 29, 2021

(65) Prior Publication Data
US 2021/0337754 A1 Nov. 4, 2021

Related U.S. Application Data

(60) Provisional application No. 63/017,759, filed on Apr. 30, 2020.

(51) Int. Cl.
*A01G 2/10* (2018.01)
*A01H 4/00* (2006.01)

(52) U.S. Cl.
CPC ..................................... *A01G 2/10* (2018.02)

(58) Field of Classification Search
None
See application file for complete search history.

(56) References Cited

U.S. PATENT DOCUMENTS

| 1,655,731 | A | * | 1/1928 | May, Jr. | ................. | A01G 9/029 |
| | | | | | | 47/6 |
| 4,216,622 | A | * | 8/1980 | Hollenbach | .............. | A01G 2/20 |
| | | | | | | 47/73 |
| 4,783,907 | A | | 11/1988 | Ravaux | | |
| 4,944,092 | A | * | 7/1990 | De Groot | ................. | A01G 3/00 |
| | | | | | | 30/124 |

(Continued)

FOREIGN PATENT DOCUMENTS

| CN | 110637623 A | | 1/2020 | | |
| DE | 102017118821 B3 | * | 1/2019 | ............... | A01G 2/20 |

(Continued)

OTHER PUBLICATIONS

Extended European Search Report, issued Sep. 20, 2021 in European Patent Application No. 21170574.4-1005, 7 pages.

(Continued)

*Primary Examiner* — Peter M Poon
*Assistant Examiner* — Kari A Bradberry
(74) *Attorney, Agent, or Firm* — CHRISTENSEN O'CONNOR JOHNSON KINDNESS PLLC

(57) ABSTRACT

The present description relates to a plant cutting device for cutting or cloning a plant, and housing the plant for growth. The plant cutting device generally comprises two compartments that are operatively connected together and displaceable from an open position to a closed position defining an enclosure, a cutter mounted within at least one of the compartments and configured to cut a plant part when the first and second compartments are displaced to the closed (Continued)

position, a cut end of the plant part being accommodated within the enclosure; and a growth medium disposed in the first compartment and/or the second compartment for contacting the cut end of the plant part allowing for the growth of the plant.

20 Claims, 11 Drawing Sheets

(56) References Cited

U.S. PATENT DOCUMENTS

| | | | |
|---|---|---|---|
| 5,225,345 A | | 7/1993 | Suzuki et al. |
| 6,289,630 B1 | | 9/2001 | Hetze et al. |
| 7,171,782 B2 | | 2/2007 | Felknor et al. |
| 7,380,662 B2 | | 6/2008 | Olsthoorn |
| 8,127,489 B2 * | | 3/2012 | Cagata ............... A01G 2/20 47/5.5 |
| 8,474,180 B2 | | 6/2013 | Berk et al. |
| 9,907,235 B2 | | 3/2018 | Struijk et al. |
| 10,750,670 B2 * | | 8/2020 | Logan ............... A01G 9/029 |
| 2017/0064915 A1 | | 3/2017 | Steelandt |
| 2017/0112076 A1 * | | 4/2017 | Kotter, Sr. ............. A01G 9/029 |
| 2018/0368333 A1 | | 12/2018 | Dorton |

FOREIGN PATENT DOCUMENTS

| | | | | |
|---|---|---|---|---|
| JP | H02127149 U | | 10/1990 | |
| JP | 2007274996 A | | 10/2007 | |
| KR | 960016185 B1 * | | 12/1996 | ............... A01G 2/20 |
| WO | 1995005730 A1 | | 3/1995 | |
| WO | WO-0243471 A1 * | | 6/2002 | ............... A01G 2/20 |
| WO | 2003022034 A1 | | 3/2003 | |
| WO | WO-2009113864 A1 * | | 9/2009 | ........... A01G 9/1073 |
| WO | WO-2011014933 A1 * | | 2/2011 | ............. A01G 31/02 |
| WO | 2012029635 A1 | | 3/2012 | |
| WO | WO-2020010412 A1 * | | 1/2020 | ............... A01G 2/10 |

OTHER PUBLICATIONS

Evans, E. and Blazich, F., "Plant Propagation by Layering," NC State Extension Publications, 6 pages, Jan. 31, 2999.
Evans, E. and Blazich, F., "Plant Propagation by Stem Cuttings," NC State Extension Publications, 12 pages, Jan. 31, 2999.

* cited by examiner

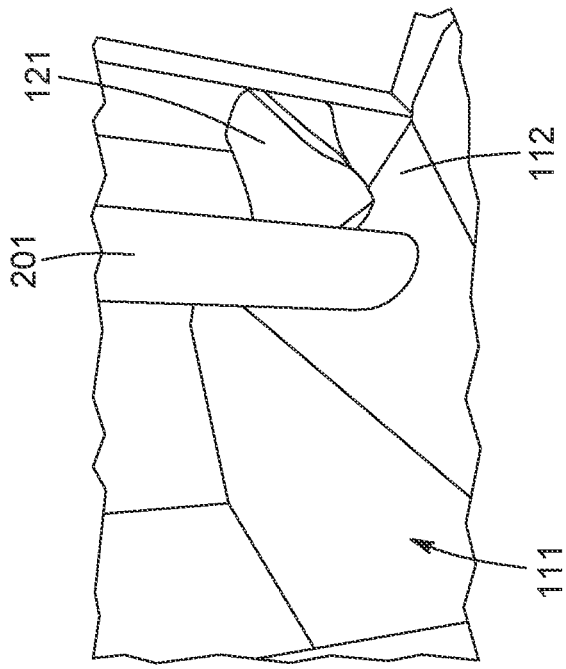
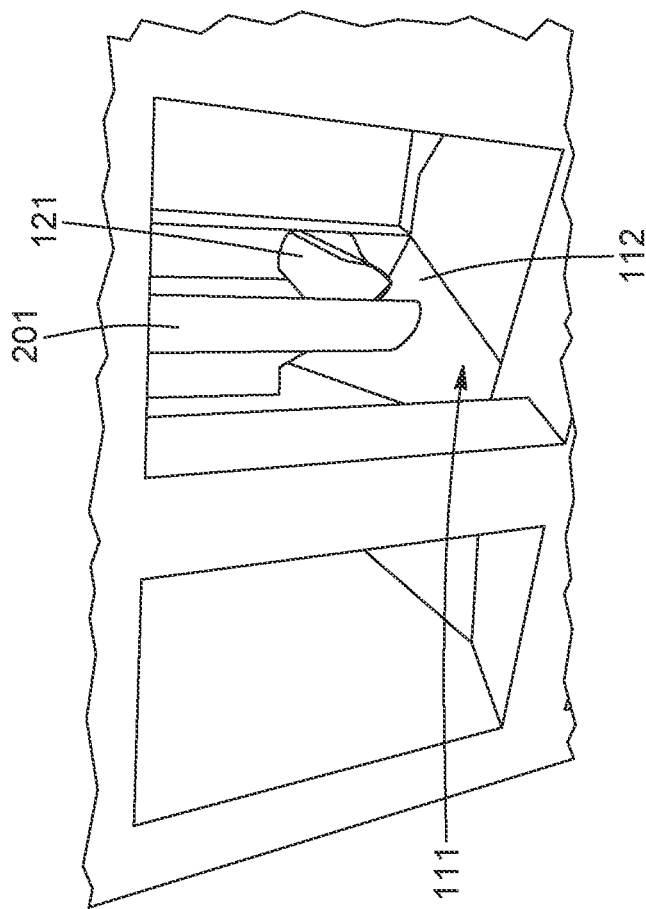
FIG. 3A
FIG. 3B

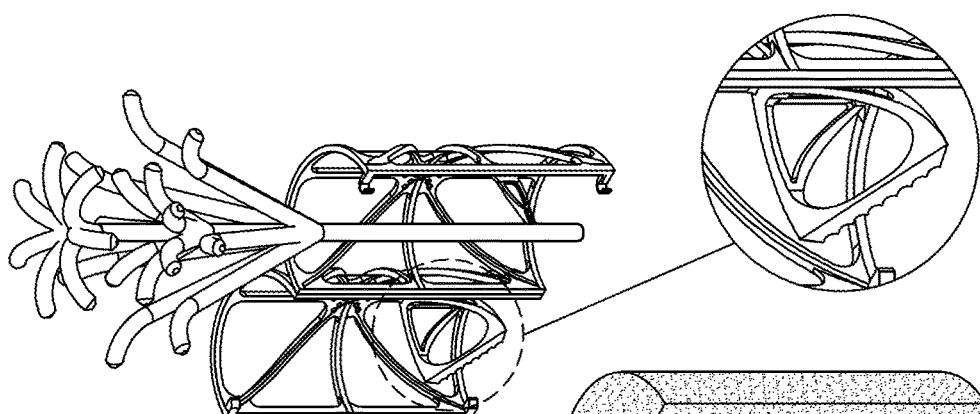
FIG. 10E
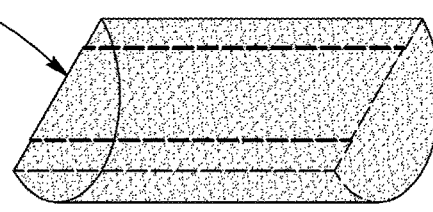
FIG. 10F
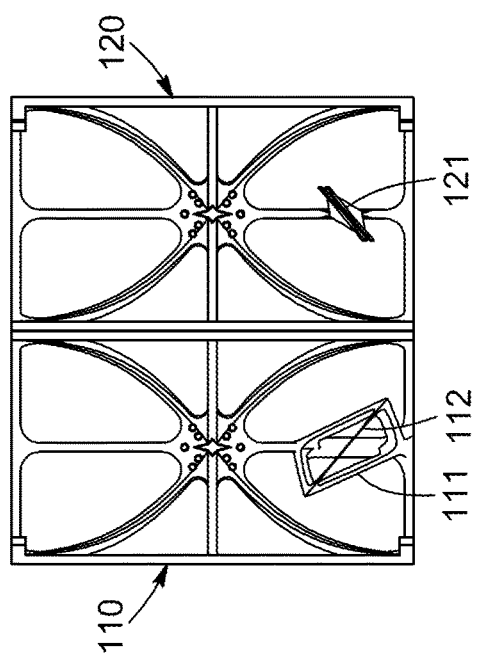
FIG. 10C
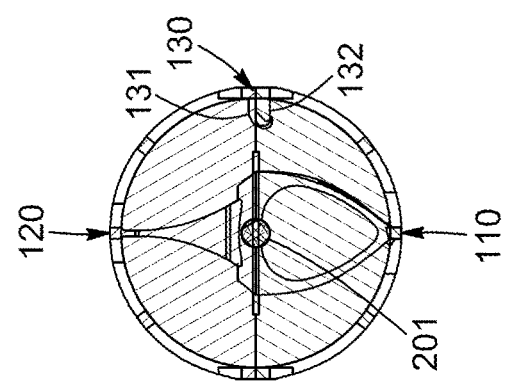
FIG. 10D
FIG. 10B
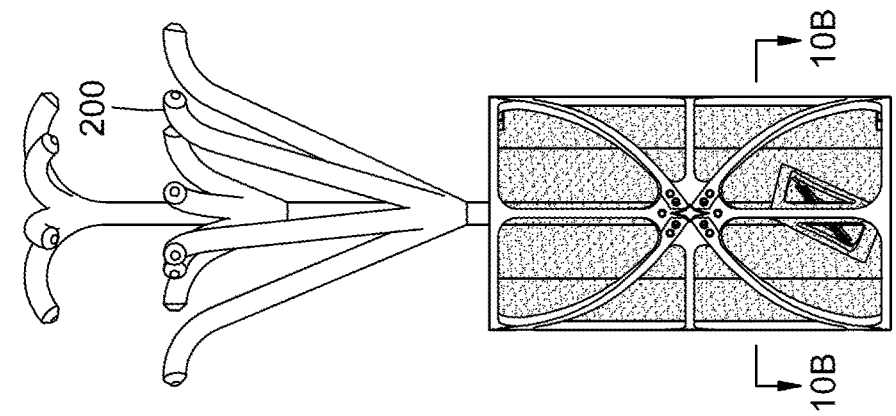
FIG. 10A

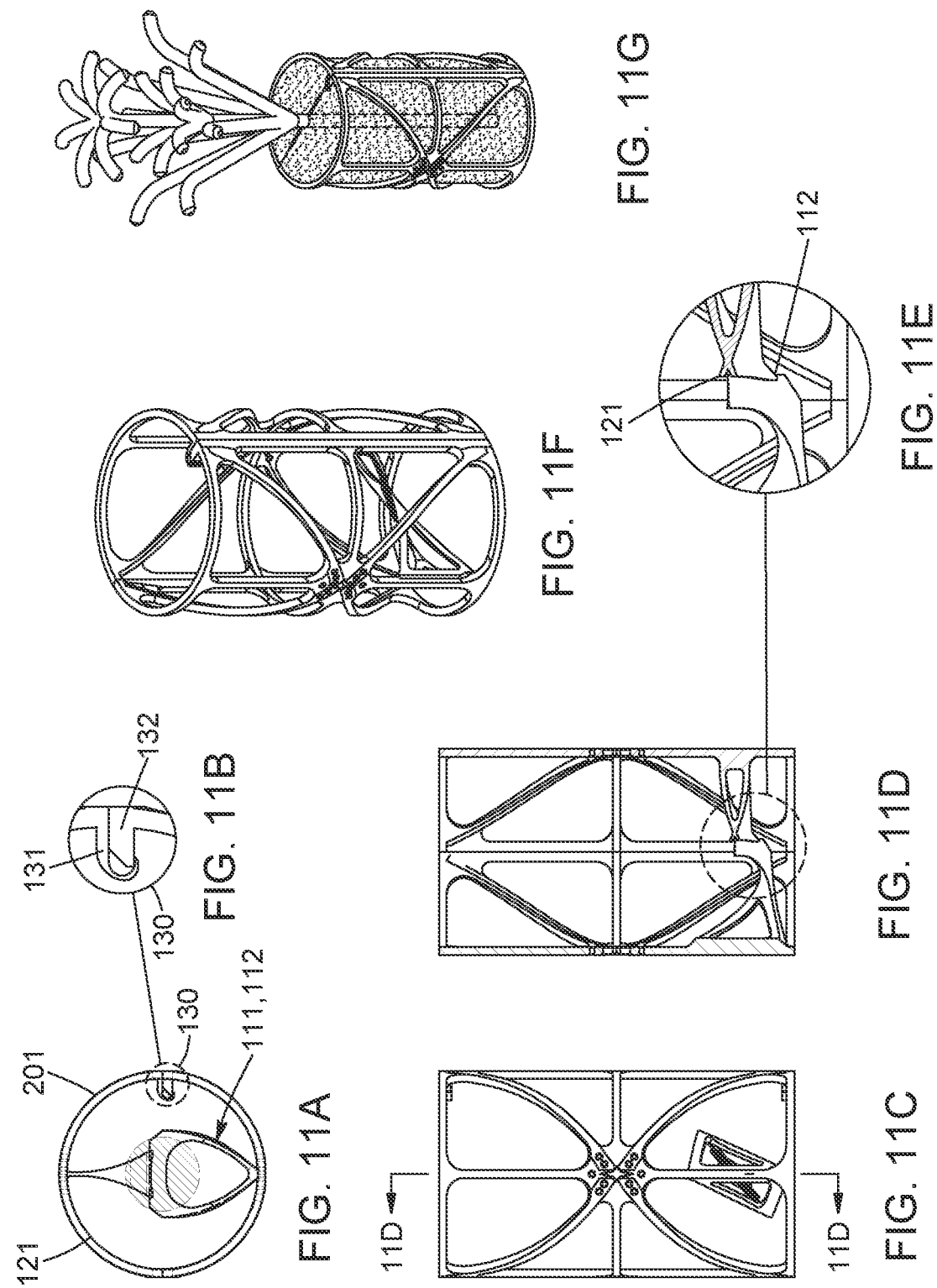

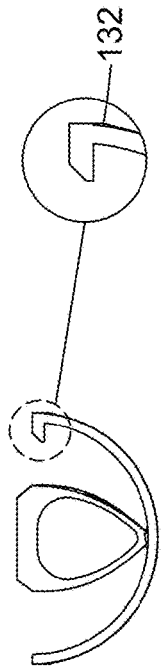
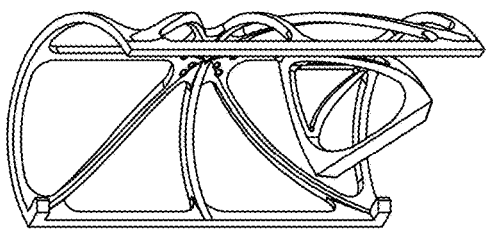
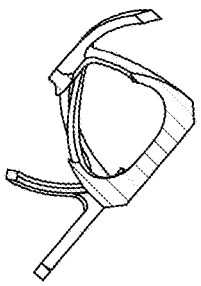
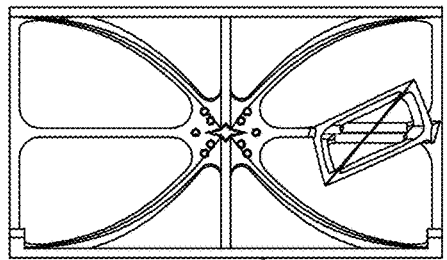
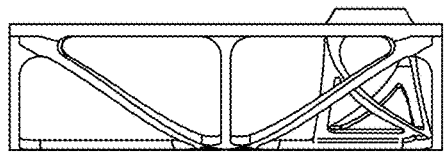

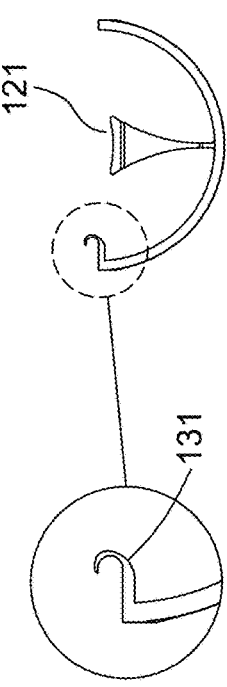
FIG. 13A
FIG. 13B
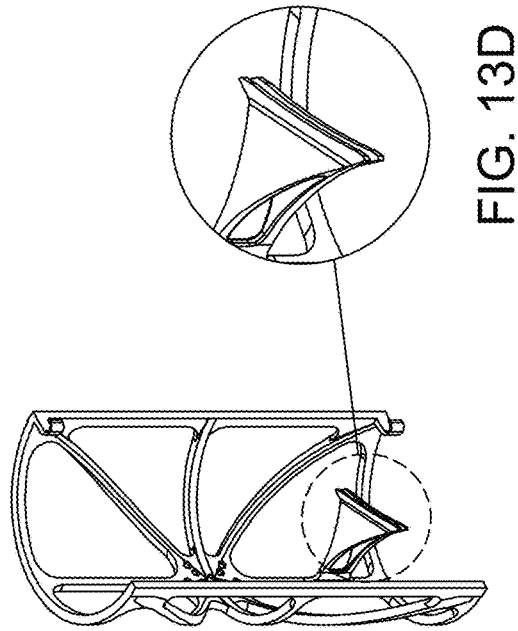
FIG. 13C
FIG. 13D
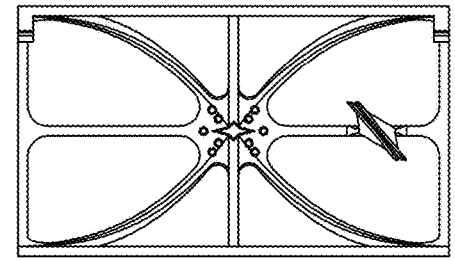
FIG. 13G
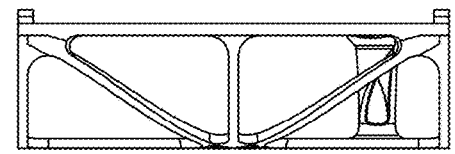
FIG. 13F
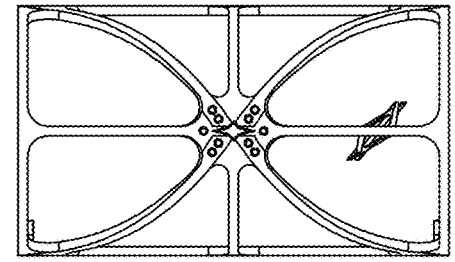
FIG. 13E

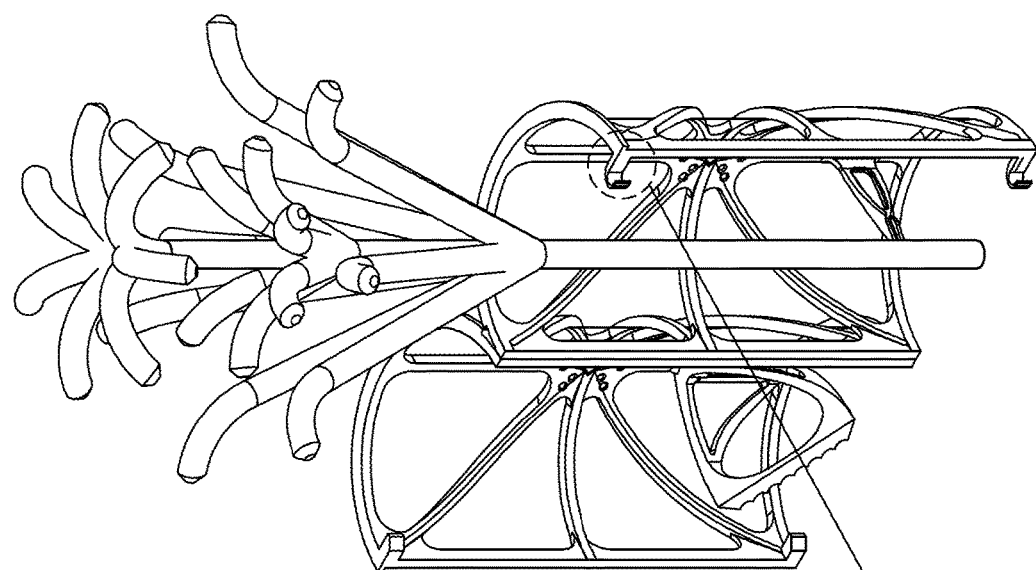
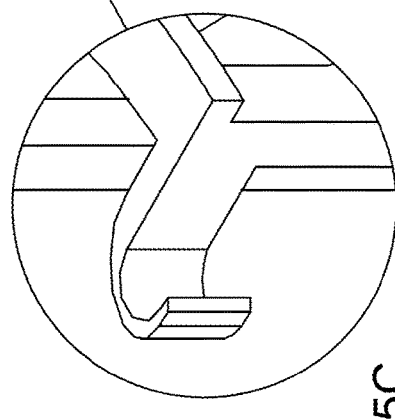
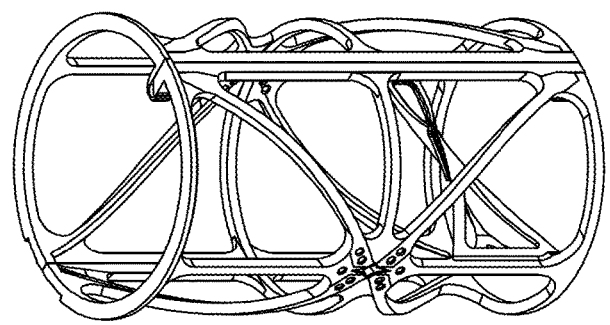
FIG. 15B
FIG. 15C
FIG. 15A

PLANT CUTTING AND CLONE-GROWTH DEVICE AND RELATED METHODS

CROSS-REFERENCE TO RELATED APPLICATION(S)

This application claims the benefit of Provisional Application No. 63/017,759 filed Apr. 30, 2020, the contents of which are hereby incorporated by reference in their entirety.

TECHNICAL FIELD

The technical field generally relates to a device for cutting and/or housing plants, and more particularly, a device for cloning plants.

BACKGROUND

Processes for cloning a plant typically include cutting a portion of a mother plant (e.g., the stem, root, or leaf) and placing the cut portion in a separate container to grow the clone. Such processes commonly rely on using a scalpel, razor blade, scissors or knife with an exposed blade to cut the plant. Consequently, there can be an increased risk of injury. Such processes can also involve inefficiencies since the cuttings may not be consistently cut at the appropriate or ideal angle and they can also be generally time consuming, tedious and labor intensive. Furthermore, these processes can harm the clone in that the cut may not be done using a sharp or sterile blade, and the cutting may therefore be susceptible to developing infections. In some cases, an additional disinfecting agent can be used. A number of precautions are also typically taken to ensure the optimal growth of the cutting. Once the cutting is obtained, it is transported to and put into growth medium that is located in a dedicated container. There is a need for a technology that overcomes at least some of the drawbacks of known cloning techniques.

SUMMARY

Various techniques are described herein for cutting and cloning a plant. For example, the plant can be cut by inserting a part of the plant between two compartments, one of which having a cutter, and then closing the compartments such that the closing motion enables the cutter to cut the plant part and then the compartment close to form an enclosure around the cut plant part. Various implementations, aspects and applications are described in further detail herein.

In some implementations, there is described herein is a device for cutting and cloning a plant, the device comprising: first and second compartments that are operatively connected together and displaceable from an open position to a closed position defining an enclosure; a cutter mounted within at least one of the compartments and configured to cut a plant part when the first and second compartments are displaced to the closed position, a cut end of the plant part being accommodated within the enclosure; and a growth medium disposed in the first compartment and/or the second compartment for contacting the cut end of the plant part.

In some implementations, there is described herein a device for cutting and cloning a plant, the device comprising: first and second compartments that are hingedly connected together and pivotable from an open position to a closed position defining an enclosure; and a cutter mounted within one of the compartments and configured to cut a plant part when the first and second compartments are pivoted to the closed position, such that a cut end of the plant part is accommodated and held within the enclosure.

In some implementations, there is described a use of the device as defined herein, for cutting and cloning a plant.

In some implementations, there is described herein a use of the device as defined herein, as a seed starter for receiving at least one seed of a plant within the enclosure.

In some implementations, there is described herein a method for cutting a plant part and producing a plant clone from the cut plant part, the method comprising: simultaneously cutting the plant part and enclosing a resulting cut end of the plant part within an enclosure comprising a growth medium.

In some implementations, there is described a method of manufacturing a cloning device, comprising: forming first and second compartments, at least one of which comprising a cutter, the first and second compartments being shaped and configured to form an enclosure when coupled together and the cutter being oriented to cut a plant part to produce a plant cutting having a cut end upon closing of the first and second compartments together.

In some implementations, there is described herein a process of producing a plant product, comprising: cloning a plant by cutting a part thereof using the device and/or method as defined herein; growing the plant clone; and harvesting a plant product from the plant clone.

In some implementations, there is described herein a method of manufacturing a cloning device, comprising: forming first and second compartments, at least one of which comprising a cutter, the first and second compartments being shaped and configured to form an enclosure when in a closed position and the cutter being oriented to cut a plant part upon closing of the first and second compartments together; hingedly attaching the first and second compartments together; and mounting a growth medium within one or both of the compartments.

In some implementations, there is described herein a method of manufacturing a cloning device, comprising: first and second compartments, wherein said first and second compartments define an enclosure when coupled together; and a cutter mounted within the first compartment and configured to cut a plant part to produce a plant cutting having a cut end when the first and second compartments are coupled together, such that a cut end of the plant part is accommodated and held within the enclosure.

In some implementations, there is described herein a method of manufacturing the cloning device as defined herein.

In some implementations, there is described herein a device for cutting and cloning a plant, the device comprising: first and second support members that are hingedly connected together and displaceable from an open position to a closed position; a cutter mounted to at least one of the support members and configured to cut a plant part when the first and second support members are displaced to the closed position to produce a plant cutting having a cut end; securing members mounted to the first and second support members and being configured to secure the plant cutting; and a growth medium mounted to at least one of the support members for contacting the cut end of the plant part.

In some implementations, there is described herein a kit comprising the plant cutting device as defined herein, a growth medium, and a plant container.

In some implementations, there is described herein a kit comprising the plant cutting device as defined herein a plant container.

BRIEF DESCRIPTION OF THE DRAWINGS

For a better understanding of the implementations described herein and to show more clearly how they may be carried into effect, reference will now be made, by way of example only, to the accompanying drawings which show at least one exemplary implementation, and in which:

FIG. 3A is a view of part of a plant cutting device showing the stem of a plant being directed by the cutter guide towards the cutter according to one example implementation.

FIG. 3B is a close-up view of part of the plant cutting device of FIG. 3A.

FIG. 10A is a front view of the plant cutting device in a closed position and housing a plant cutting present within the device according to one example implementation.

FIG. 10B is a top view of the plant cutting device in a closed position comprising the cutter, blade cutter guide, and a locking mechanism.

FIG. 10C is a front view of the plant cutting device in an open position comprising the cutter, blade, and cutter guide.

FIG. 10D is an isolated view of the growth medium.

FIG. 10E is a front elevated view of the plant cutting device in an open position and housing a plant cutting present within the device, and comprising a cutter, serrated blade, and cutter guide, according to one example implementation.

FIG. 10F is a close-up view of the cutter and serrated blade.

FIG. 11A is a top view of the plant cutting device comprising a locking mechanism for locking the compartments.

FIG. 11B is a close-up view of the locking mechanism comprising a receiving end (or hook) and locking end (or latch).

FIG. 11C is a back view of the plant cutting device.

FIG. 11D is a side internal view of the plant cutting device in a closed position.

FIG. 11E is a close-up view of the blade meeting the cutter.

FIG. 11F is a top elevated view of the plant cutting device in a closed position.

FIG. 11G is a top elevated view of the plant cutting device in a closed position and housing a plant cutting.

FIGS. 12A and 12D are top views of the compartment comprising the cutter and blade of the plant cutting device, and a locking end (or latch) of the locking mechanism, according to one example implementation.

FIG. 12B is a close-up view of the locking end (or latch) of the locking mechanism.

FIG. 12C is a back view of the compartment comprising the cutter and blade of the plant cutting device.

FIG. 12E is a side view of the compartment comprising the cutter and blade of the plant cutting device.

FIG. 12F is a front view of the compartment comprising the cutter and blade of the plant cutting device.

FIG. 12G is a close-up view of the cutter and blade of the plant cutting device.

FIG. 12H is a front elevated of view of the compartment comprising the cutter and blade of the plant cutting device.

FIG. 13A is a top view of the compartment comprising the cutter guide of the plant cutting device, and a receiving end of the locking mechanism, according to one example implementation.

FIG. 13B is a close-up view of the receiving end (or hook) of the locking mechanism.

FIG. 13C is a front elevated view of the compartment comprising the cutter guide of the plant cutting device.

FIG. 13D is a close-up view of the cutter guide of the plant cutting device.

FIG. 13E is a back view of the compartment comprising the cutter guide of the plant cutting device.

FIG. 13F is a side view of the compartment comprising the cutter guide of the plant cutting device.

FIG. 13G is a front view of the compartment comprising the cutter guide of the plant cutting device.

FIG. 15A is a front elevated of view of the plant cutting device in a closed position comprising an outwardly extended lip of the top ring formed by the top portion of the device defining the central space.

FIG. 15B is a front elevated of view of the plant cutting device in an open position comprising an extended lip of a top ring of a top portion of the device defining a central space. The compartments further comprise a receiving end (or hook) and locking end (or hatch) of the locking mechanism.

FIG. 15C is a close-up view of the receiving end (or hook) of the locking mechanism.

It will be appreciated that for simplicity and clarity of illustration, elements shown in the figures have not necessarily been drawn to scale. For example, the dimensions of some of the elements may be exaggerated relative to other elements for clarity. Nevertheless, for disclosure purposes, it should be understood that the relative proportions of the various elements as shown in the figures are disclosed.

DETAILED DESCRIPTION

The present description relates to devices and methods that facilitate cutting and growing a plant part to produce a clone. The device enables both cutting the plant part to separate it from the mother plant and housing or otherwise holding the cutting to facilitate contact with growth medium. In some implementations, the device can include opposed compartments that can move from an open position to receive the plant part, and a close position to house the plant part, where movement to the closed position enables a cutter to contact and cut the plant part to separate it to form the cutting that is housed by the closed compartments. The device can also include growth medium that is located in one or both of the compartments, such that it is available to the cutting. The closed compartments with the supported cutting and integrated growth medium can thus be planted to enable efficient growth of the plant clone.

Figure 1B:
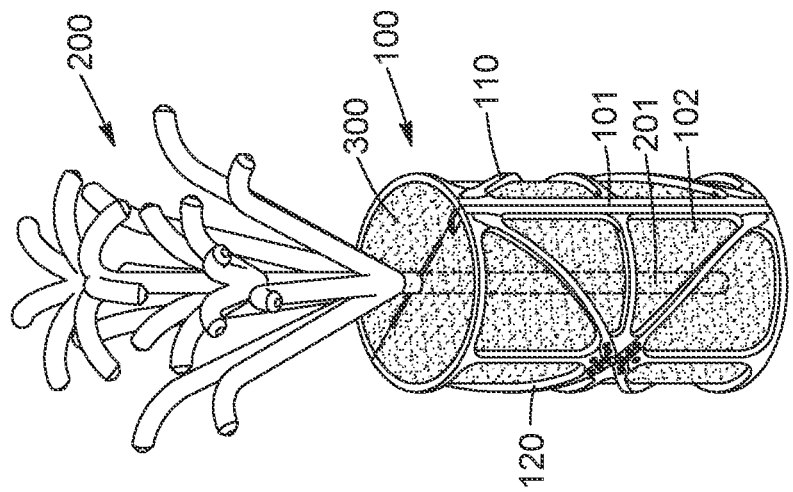
FIG. 1B is a front elevated view of the plant cutting device in a closed position and housing a plant cutting present within the device according to one example implementation.
Figure 1A:
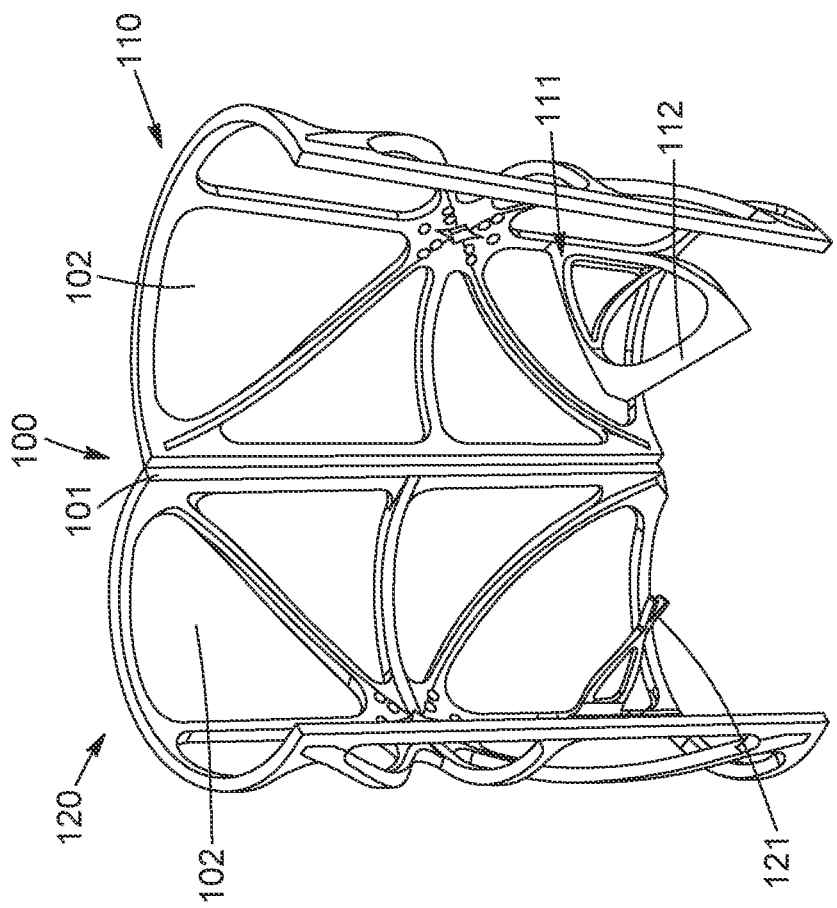
FIG. 1A is a front elevated view of the plant cutting device in an open position and comprising two compartments according to one example implementation.

FIG. 1 illustrates a plant cutting device 100 in an open (FIG. 1A) and a closed position (FIG. 1B). The plant cutting device 100 comprises two compartments 110 and 120, which can be connected by a hinge 101. Compartment 110 comprises a sidewall with a plurality of openings 102, and a cutter 111 which comprises a blade 112. Compartment 120 comprises a sidewall with a plurality of openings 102, and cutter guide 121.

According to one example implementation, a plant 200 is placed inside the plant cutting device 100 when in an open position. The stem of the plant 201 is placed adjacent to the cutter guide 121. A growth medium 300 can also be present inside one or both compartments, such that it can surround or otherwise be positioned to be available for the stem 201 of the plant 200 after cutting. The growth medium 300 can be pre-installed within one or more of the compartments or it can be inserted after the plant stem is positioned within the device 100 in the open position. The two compartments 110 and 120 of the plant cutting device 100 can be pivoted toward each other to close the device, which causes the blade 112 to cut the stem. During the closing of the compartments, the stem 201 can be held or displaced by the cutter guide 121 as the blade 112 of the cutter 111 engages and cuts the stem 201.

Figure 2B:
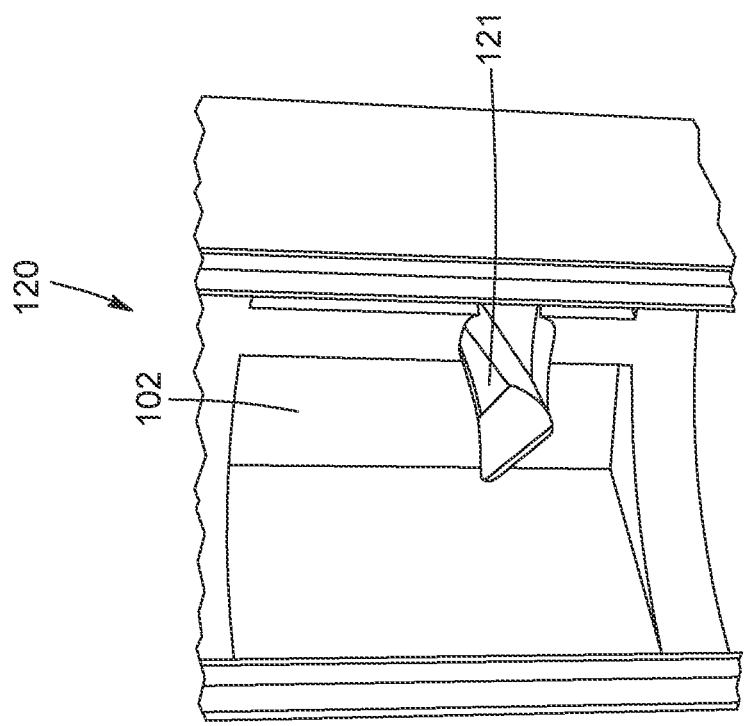
FIG. 2B is a front view of part of a compartment of a plant cutting device comprising a cutter guide according to one example implementation.
Figure 2A:
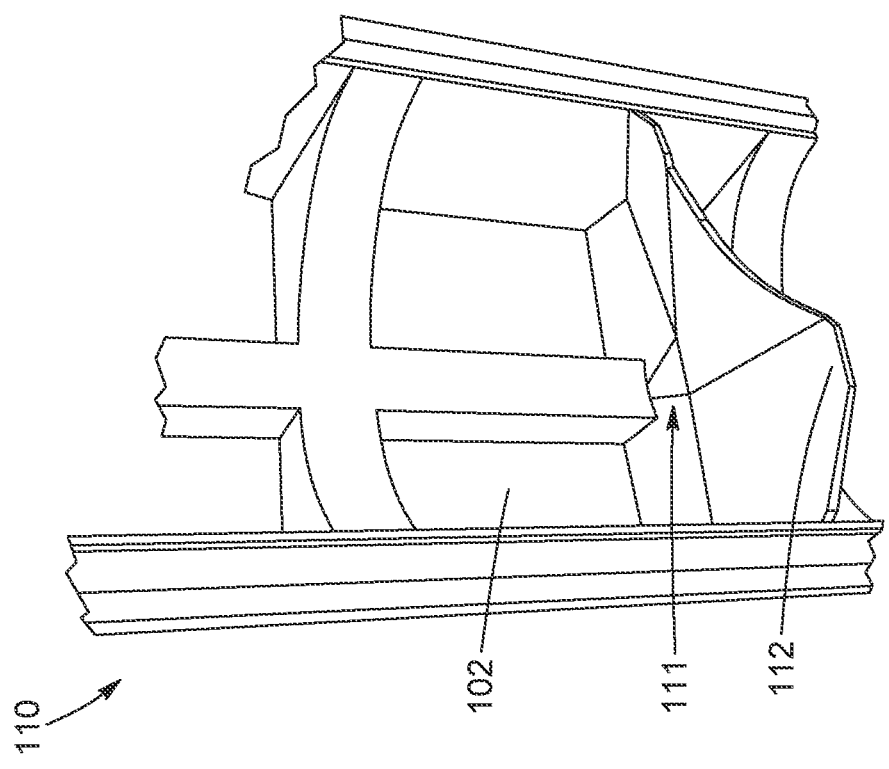
FIG. 2A is a front elevated view of part of a compartment of the plant cutting device comprising a cutter according to one example implementation.
Figure 4:
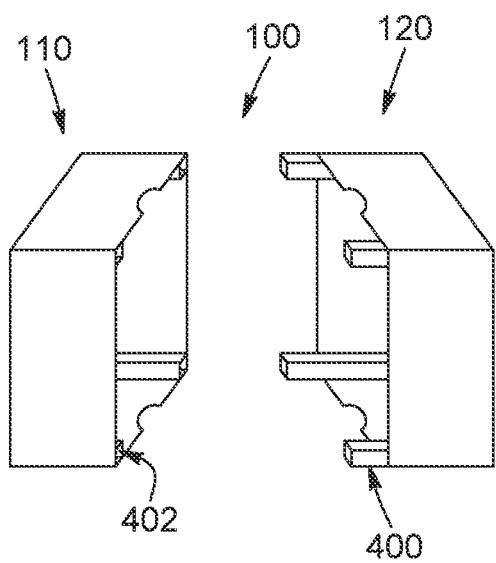
FIG. 4 is a bottom view schematic of the plant cutting device comprising compartments that are joinable using a slot-and-bar system according to one example implementation.

The compartments 112, 120 can be joined by a hinge so that the movement between the open and closed positions is done by pivoting. Alternatively, the compartments could be joined together in other ways using other mechanisms so that the compartments can move from the open position to the closed position. For example, as shown in FIG. 4, the compartments 110, 120 could be joinable using a slot-and-bar system where one compartment 120 has bars 400 that slide into slots 402 located in the opposed compartment 110, thus moving by translation with respect to each other. Different arrangements of slots and bars, as well as various shapes and sizes and configurations of the slots and bars, could be used. For instance, each compartment could have both slots and bars, with the opposed compartment having a complementary arrangement so that once the plant part is positioned in between the compartments, the two compartments can be displaced toward each other to reach the closed position as the plant part is cut. The hinge 101 type connection, an example of which is shown in FIGS. 1A and 1B, can facilitate receiving the plant part since the open position has one fully open side and movement to the closed position is relatively easy once the plant part is located in between the compartments 110, 120. According to some example implementations, the blade 112 of the cutter 111 is oriented horizontally. In a preferred implementation, the blade 112 is sharp and angled at 45 degrees, as illustrated in FIGS. 1A, and 10-13, to increase the surface area of the stem cutting for water and nutrient uptake. The blade is generally very sharp, as to not damage the stem or plant part during cutting. In other implementations, the blade 112 is angled between 0 and 60, 10 and 60, 20 and 60, 30 and 60, 40 and 60, or 40 and 50 degrees. In some implementations, the angle of the blade 112 is a lateral angle about a lateral axis extending through the first and second compartments in the closed position, as illustrated in FIGS. 2A, 3A and 3B. In some implementations, the cutter 111 extends across most or all of the width of the first and/or second compartment to ensure that the blade 112 makes contact with the stem 201.

According to some example implementations, the plant cutting device 100 comprises the cutter guide 121, as illustrated in FIGS. 1A, 2B, 3A, 3B, 11, and 13. In some aspects, the cutter guide directs a plant part (e.g., a stem) towards the blade 112 on the cutter 111. In some aspects, cutter guide 121 is positioned at the same height relative to the blade 112. The cutter guide 121 can comprise a groove or opening along its blunt end and is shaped so that the blade 111 can fit inside the groove when the device 100 is in a closed position, as illustrated in FIG. 11. In some aspects, the cutter guide 121 is positioned just above the blade 112 providing an opposite force to the blade 112 during cutting, as illustrated in FIGS. 3A, 3B, 10 and 11. In some aspects, the cutter guide 121 slightly overlaps the blade 112 when the device is in a closed position. The cutter guide 121 can have a blunt-shaped end, as to not cut the stem. In some aspects, the cutter guide 121 is oriented at the same angle as the cutter 111. The cutter guide 121 can also extend across most or all of the width of the first and/or second compartment. The cutter guide 121 may also comprises a clamp for holding the plant part in place. The blade 111 of the cutter 112 may be shaped so that it fits inside the groove of the elongated channel of the cutter guide and it may have a corresponding shape and size. In some aspects, the cutter guide 121 is an elongated channel that holds the plant part in place.

According to some example implementations, the first 110 and second 120 compartments of the plant cutting device 100 are shaped so that the enclosure is generally box-shaped, as illustrated by the prototype in FIG. 14, or cylindrical-shaped as in FIG. 1. In some implementations, the height, width, and length of the compartments can be configured corresponding to the size of the plant or stem of the plant that is being cloned. In some implementations, each compartment comprises a bottom portion, sidewalls, and a top portion. The top portion may comprise a top wall and an aperture provided therethrough and sized so that the cut plant part extends through the aperture after cutting. The top portion may comprise a top ring defining a central space and the bottom portion may comprise a bottom ring. In some aspects, the compartments comprises sidewalls which comprise spines that extend between the top ring and the bottom ring. The compartments may also comprise a plurality of openings 102 that allow for the propagation of roots for the proper growth of the cutting, as well as provide an influx of nutrients from the growth medium during growth. The compartments may be configured so that the enclosure is cage-like with a plurality of the openings 102. The compartments can each include a hub and spine-like supports extending from the hub to connect it to the top and bottom portions. The spine-like supports can be relatively thin, as illustrated in FIG. 1 for example, and can include two opposed vertical members extending up and down, two opposed side members extending across, and four oblique members extending to the corners. According to some example implementations, the first and second compartments are shaped so that the enclosure or device is generally box, cylinder, cone, or inverted cone shaped.

According to some example implementations, the device further comprises an elongated channel defined along a longitudinal axis of the enclosure and sized to receive the plant part. In some aspects, the elongated channel is defined by the growth medium.

According to some example implementations, the compartments comprise a locking mechanism 130 arranged and configured to lock the compartments together in the closed position, as illustrated in FIGS. 10-13. The first compartment may comprise a hook 131 or receiving end of the locking mechanism on its unhinged edge (FIG. 13, FIG. 15B, and FIG. 15C), which latches onto the unhinged edge or locking end of the locking mechanism of the second compartment (FIG. 12, FIG. 15B, and FIG. 15C), to lock the device in the closed position. The second compartment may also comprise a latch 132 or attachment point along its unhinged edge, shaped so that the hook can engage it in the closed position. Various locking mechanisms and structures are possible and may include structural elements that are located at various places on the compartments, e.g., on a side, middle, bottom and/or top edge or surface. For instance, the first compartment may comprise a ball or bar, which fits inside a socket or slot on the second compartment, to lock the device in the closed position. In some implementations, the compartments are not permanently locked in a closed position and may be returned to an open configuration. For example, the locking mechanism 130 may be locked in the closed position, then unlocked to move back to the open position; or the device can be provided without a locking mechanism so that the compartments can be moved between the open and closed positions by a user. According to some example implementations, the locking mechanism may comprise a magnetic system, rubber band, or Velcro™ fasteners.

According to some example implementations, the device comprises an outwardly extended upper lip of the top ring of the top portion of the device defining the central space. The first 110 and/or second 120 compartments (or first 612 and second 620 support members) may comprise an extended lip 115 and 125 on their top portion(s) (FIGS. 15A and 15B). Said lip may allow for a better suspension of the device in a variety of commonly used plant holders and towers. For example, the device may be suspended in an aeroponic or hydroponic system or tower.

Figure 9:
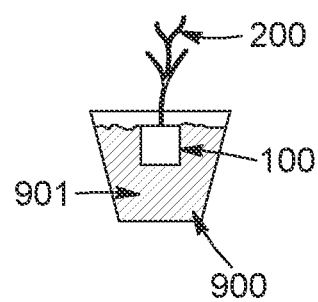
FIG. 9 illustrates the plant cutting device comprise the plant cutting placed in a larger plant container for growth of the plant.
Figure 14C:
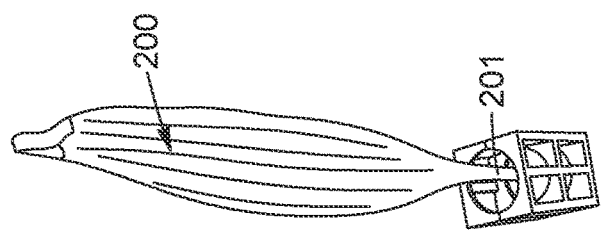
FIG. 14C represents a photograph of an elevated view of the plant cutting device in a closed position and housing a plant cutting present within the device according to one example implementation.
Figure 14B:
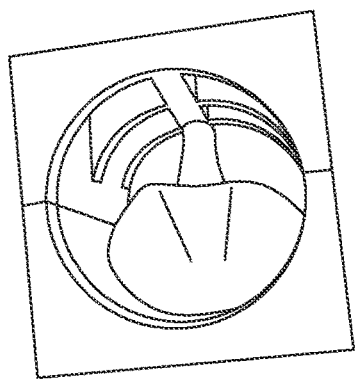
FIG. 14B represents a photograph of a top view of the plant cutting device in a closed position, comprising a cutter, blade, and cutter guide.
Figure 14E:
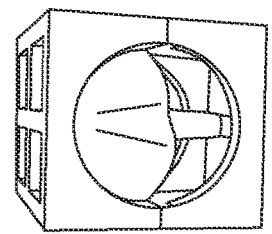
FIG. 14E represents a photograph of a bottom view of the plant cutting device in a closed position, comprising a cutter, blade, and cutter guide, according to an example implementation.
Figure 14A:
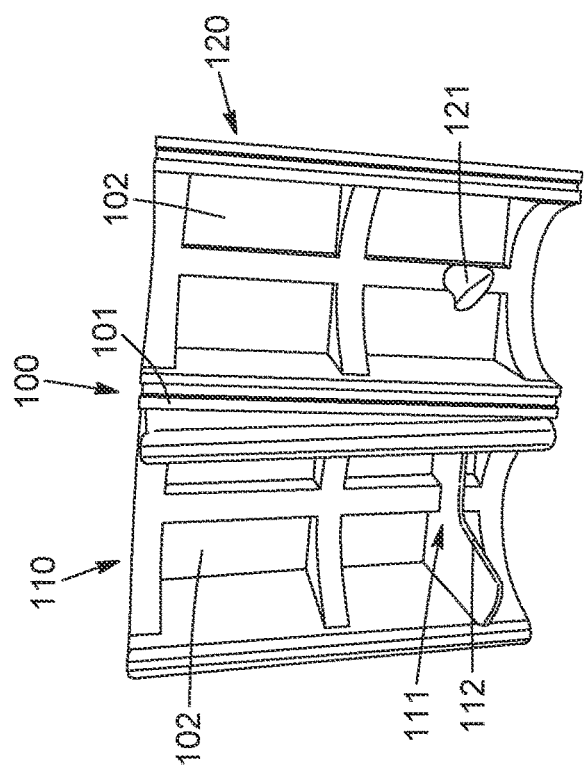
FIG. 14A represents a photograph of a front elevated view of the plant cutting device in an open position, comprising a cutter, blade, and cutter guide, according to an example implementation.
Figure 14D:
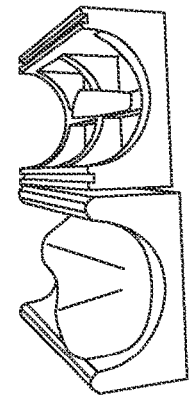
FIG. 14D represents a photograph of a bottom view of the plant cutting device in an open position, comprising a cutter, blade, and cutter guide, according to an example implementation.

According to one example implementation, the cutting or clone of the plant is grown within the device. In some aspects, as illustrated in FIG. 9, the device 100 housing the plant cutting is placed in a larger plant container 900 comprising additional growth medium or soil 901, under conditions suitable for growth of the plant 200. The container 900 can include any vessel that is used for growing a plant, including but not limited to a pot, box, tray (e.g., multi-well tray), or aeroponic or hydroponic tower or system. According to some example implementations, the extended lips 115 and 125 may be retractable, foldable, or collapsible. For example, the lip or lips may be retracted or collapsed during a rooting phase of the plant part or in order to save space, if required, in certain growing systems. The lips may also be extended or folded outward prior to placing or suspending in certain growing systems, such as in aeroponic or hydroponic systems or towers.

According to some example implementations, the growth medium is any medium that allows for the proper growth of a plant. In some aspects, the growth medium is sized to substantially fill the enclosure. In some aspects, the growth medium is sized and configured to include two growth medium blocks that fit into the first and second compartments respectively. The growth medium may form a solid structure that remains within the compartment on its own. Alternatively, the growth medium may also be a loose medium, in which case it may be held together with a retention structure (e.g. a netting) to hold it in place within the compartments of the device. Examples of a growth medium include, but are not limited to, a growth medium comprising peat foam, rock wool, stone wool, coco coir, perlite, vermiculite, peat moss, sand earth mix, and/or soil. One or more rooting hormones or other rooting or growth promotion substances can also be included in the growth medium.

Figure 16G:
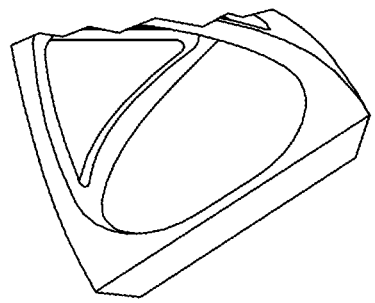
FIG. 16G is a close-up view of the cutter comprising a straight-edge blade, according to an example implementation.
Figure 16E:
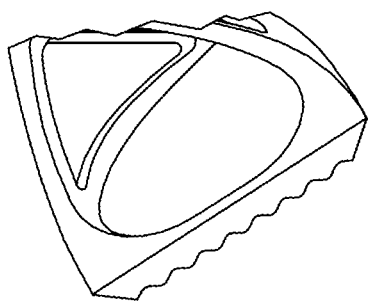
FIGS. 16E and 16F are a close-up view of the cutter comprising a serrated-edge blade comprising serrations in a wavy pattern, according to an example implementation.
Figure 16F:
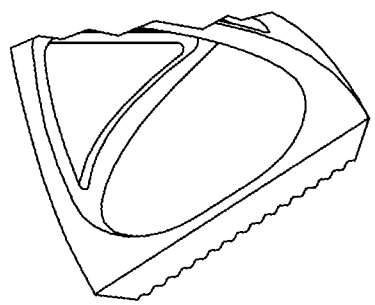
Figure 16C:
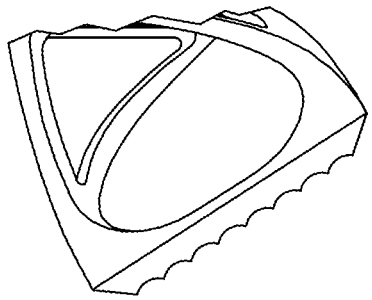
FIGS. 16C and 16D are a close-up view of the cutter comprising a serrated-edge blade comprising serrations in a half-circular pattern, according to an example implementation.
Figure 16D:
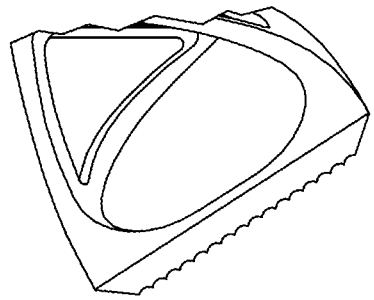
Figure 16A:
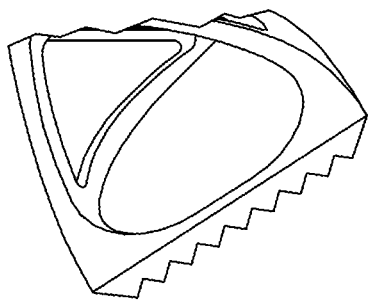
FIGS. 16A and 16B are a close-up view of the cutter comprising a serrated-edge blade comprising serrations in a triangular pattern, according to an example implementation.
Figure 16B:
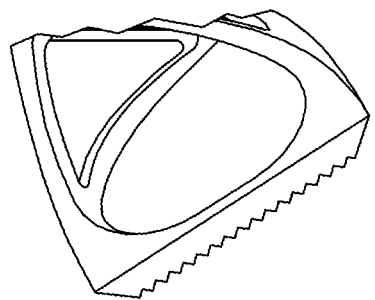

In some implementations, the device is made completely or partially of metal, plastic, paper or cardboard. In some implementations, the device is made completely or partially of bio-based, biodegradable and/or compositable materials (e.g., a seaweed-based bioplastic such as Algoblend™ or Algopack™). In some aspects, the plant cutting device is sterilized or made of sterile materials, to prevent any infections from developing in the plant. In some implementations, the device decomposes and serves as a source of nutrients for the growth of the plant cutting, which also provides more space for the roots to expand. In some implementations, the blade 112 is made completely or partially of metal, plastic, paper or cardboard. In some implementations, the blade 112 is made completely or partially of bio-based, biodegradable and/or compositable materials. In some implementations, the blade comprises a partial or complete serrated edge (e.g., see FIGS. 10E, 10F, and 15B) or a straight edge (FIGS. 12A, 12H, and 16G). When using a blade 112 with a serrated edge, the serrations 113 can have various forms, orientations and sizes depending on the plant part to be cut and the configuration of the device (FIGS. 16A-16F). For example, the serrations 113 may comprises pointy or triangular edges or more circular or convex edges. Furthermore, the serrations 113 may comprise a triangular (FIGS. 16A and 16B), half circular (FIGS. 16C and 16D), wavy (FIGS. 16E and 16F) pattern, resulting in a corresponding cut on the plant part (e.g., stem). According to some example implementations, a serrated cut may increase the surface area of the plant part, exposing more of the cambium layer of the plant part, and enhance growth of the clone. The blade is generally very sharp, as to not damage the stem or plant part during cutting. The cutter 111 can have one or more other features as well, such as including two or more blades, one or more movable blade (e.g., a scissor), or other cutting features. According to some example implementation, each compartment may comprise a cutter comprising a blade.

According to some example implementations, is a use of the plant cutting device as described herein for cutting and cloning (e.g., propagating or striking) a plant. According to some example implementations, is a use of the plant cutting device as described herein as a seed starter for receiving at least one seed of a plant within the enclosure. Thus, if a plurality of the devices are provided, some of them could be used for plant cuttings and cloning, while others could be used as seed starters where the blade is not used to cut a plant part. A seed of a plant can be placed within the plant cutting device, along with growth medium, and is grown within the device. In this scenario, the growth medium present in the compartments could include a cavity sized and configured to receive the seed in the device's open position, and then in the closed position the growth medium surrounds the seed. In some aspects, the device containing the seed is placed in a larger plant container, as described herein. According to some example implementations, the plant cutting device is used for stem, root, scion or leaf cutting. It is also noted that an embodiment of the device could have no cutting elements so as to be dedicated as a seed starter device; in this case the device could have one or more of the other features described herein but may or may not have the cutting element or guide since the seed would not require cutting. In the seed starter embodiment of the device, the growth medium could define a seed cavity for receiving the seed as well as one or more growth openings communicating with the seed cavity that facilitates growth of the roots, stem and/or other parts of the germinating and growing plant.

According to some example implementations, is a method for cutting a plant part and producing a plant clone from the cut plant part, the method comprising: simultaneously cutting the plant part and enclosing a resulting cut end of the plant part within an enclosure comprising a growth medium. In some aspects, the method is performed using the device as described herein. In some aspects, the method is for stem, root, scion or leaf cutting.

According to some example implementations, is a process of producing a plant product, comprising: cloning a plant by cutting a part thereof using the device and/or method as described herein; growing the plant clone; and harvesting a plant product from the plant clone. In some aspects, the process is for stem, root, scion or leaf cutting.

According to some example implementations, is a method of manufacturing a cloning device, comprising: forming first and second compartments, at least one of which comprising a cutter, the first and second compartments being shaped and configured to form an enclosure when in a closed position and the cutter being oriented to cut a plant part upon closing of the first and second compartments together; hingedly attaching the first and second compartments together; and mounting a growth medium within one or both of the compartments. In some aspects, the method comprises using a plant cutting device having one of more features as described herein.

According to some example implementations, is a kit comprising the plant cutting device described herein, a growth medium, and a larger plant container. In some aspects, the kit may comprise a seed of a plant.

According to some example implementations, the plant is a herbaceous, softwood, semi-hardwood or semi-ripe, and/or hardwood plant. Examples of the plant include but are not limited to Pothos, Tradescantia, Umbrella plant, African violets, rosemary, Philodendron, prayer plant, Boston fern, Peace lily, ZZ plant, Snake plant, Spider plant, aloe vera, bromeliad, ponytail palm, aster, butterfly bush, chrysanthemum, hydrangea, rose, salvia, boxwood, dahlia, gardenia, azalea, camellia, honeysuckle, angel's trumpet, dianthus, carnation, geranium, jade, lavender, penstemon, and/or veronica. In some aspects, any plant part, including but not limited to a root or leaf of a plant, can be placed in the plant cutting device for cutting and growing.

Figure 5:
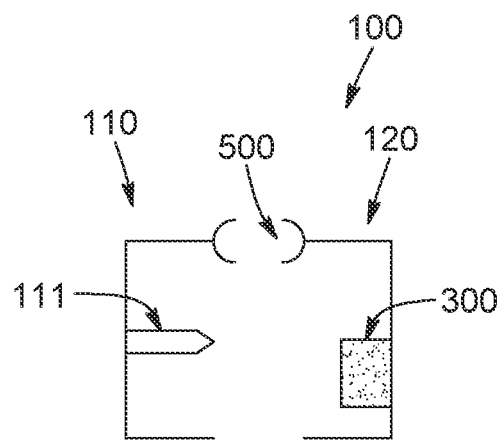
FIG. 5 is a side view schematic of the plant cutting device showing securing members for holding the plant in place, according to one example implementation.

FIG. 5 schematically shows that the device 100 can include securing members 500 that are configured to secure the plant cutting in place in the closed position. In some cases, the securing members can be part of the compartments themselves, as shown in FIG. 1 for example. In other cases, the securing members can be distinct members can extend and/or have dedicated mechanisms for holding the plant cutting in place after it is cut. The securing members 500 can be complementarily shaped and configured to wrap or clamp around the plan part. The securing members 500 may span a certain height of the device and/or may be located at multiple locations along the height so that the plant part has several support points along the device.

Referring to FIGS. 1 to 5, the device 100 has compartments 110 and 120 that define an enclosure in the closed position, although it should be noted that the enclosure can have openings and can even be substantially "open" or porous as shown in the cage-like implementation of FIG. 1. This enclosure-enabling structure can facilitate accommodating the growth medium 300 as well as housing and securing the plant cuttings.

Figure 6:
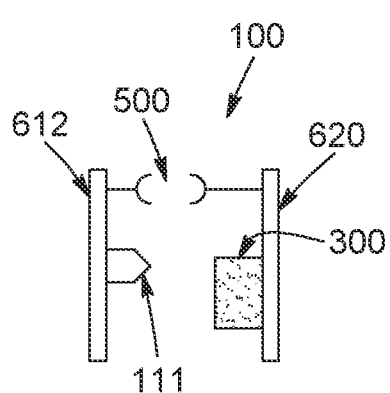
FIG. 6 is a side view schematic of the plant cutting device comprising support members, according to one example implementation.
Figure 7:
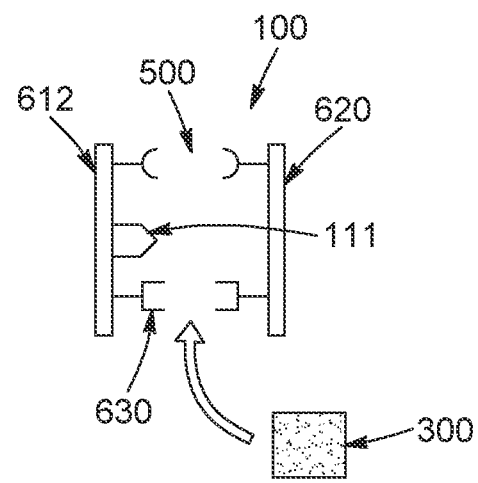
FIG. 7 is a side view schematic of the plant cutting device comprising support members and growth medium supports, according to one example implementation.
Figure 8:
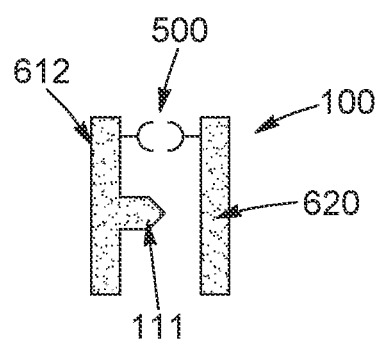
FIG. 8 is a side view schematic of the plant cutting device comprising support members that comprise a cutter, where the support members and cutter are composed of the growth medium, according to one example implementation.

Alternatively, FIGS. 6 to 8 show the device 100 with support members 612, 620 that do not necessarily form an enclosure in the closed position. In such implementations, the plant cutting can be secured using dedicated securing members 500 that support the plant part after cutting. The cutter 111 and the growth medium 300 can be mounted to the support members such that displacement toward the closed position enables the cutting of the plant part as well as positioning of the growth medium 300 at or proximate to the cut end of the cutting. As shown schematically in FIG. 7, the growth medium 300 can be mounted to one or both of the support members 612, 620 via a growth medium support 630.

It will be appreciated that, for simplicity and clarity of illustration, where considered appropriate, reference numerals may be repeated among the Figures to indicate corresponding or analogous elements or steps. In addition, numerous specific details are set forth in order to provide a thorough understanding of the exemplary implementations described herein. However, it will be understood by those of ordinary skill in the art, that the implementations described herein may be practiced without these specific details. In other instances, well-known methods, procedures and components have not been described in detail so as not to obscure the implementations described herein. Furthermore, this description is not to be considered as limiting the scope of the implementations described herein in any way but rather as merely describing the implementation of the various implementations described herein.

The use of the word "a" or "an" when used in conjunction with the term "comprising" in the claims and/or the specification may mean "one" but it is also consistent with the meaning of "one or more", "at least one", and "one or more than one".

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, advantages and features of the present description will become more apparent upon reading of the following non-restrictive description of specific implementations thereof, given by way of example only with reference to the accompanying drawings.

The invention claimed is:

1. A plant cutting, planting, and cloning device, the device comprising:
    first and second compartments that are operatively connected together and displaceable from an open position to a closed position defining an enclosure, wherein each of the first and second compartments comprises a bottom portion, a top portion, and sidewalls extending between the top portion and the bottom portion, and wherein each of the sidewalls comprises at least one opening sized and configured for root propagation therethrough during plant cutting growth;
    a cutter mounted within at least one of the compartments and configured to cut a plant part to completely separate it from the plant to produce a plant cutting having a cut end when the first and second compartments are displaced to the closed position, the cut end of the plant cutting being accommodated within the enclosure; and
    a growth medium disposed in the first compartment and/or the second compartment for contacting the cut end of the plant cutting and promoting growth of the plant cutting within the enclosure upon planting of the device and propagation of roots via the at least one opening in each of the sidewalls to produce a plant clone.

2. The device of claim 1, wherein the first and second compartments are operatively connected via a hinge for pivoting from the open position to the closed position.

3. The device of claim 1, wherein the cutter comprises a blade that is oriented at an angle with respect to a generally vertical orientation of the plant part, wherein the angle is between 30 and 60 degrees.

4. The device of claim 1, wherein the first and second compartments comprise a locking mechanism arranged and configured to lock the compartments together in the closed position.

5. The device of claim 1, wherein the cutter is mounted in the first compartment and the second compartment comprises a cutter guide for receiving and supporting the cutter when the compartments move to the closed position.

6. The device of claim 1, wherein the device is configured for cutting a root, a scion, an eye, a leaf, or a stem of the plant or a combination thereof.

7. A plant cutting, planting, and cloning device, the device comprising:
    first and second support members that are hingedly connected together and displaceable from an open position to a closed position, wherein each of the first and second support members comprises a bottom portion, a top portion, and sidewalls extending between the top portion and the bottom portion, wherein the first and second support members are first and second compartments, respectively, which define an enclosure in the closed position, and wherein each of the sidewalls comprises at least one opening sized and configured for root propagation therethrough during plant cutting growth;
    a cutter mounted to at least one of the support members and configured to cut a plant part to completely separate it from the plant when the first and second support members are displaced to the closed position to produce a plant cutting having a cut end;
    securing members mounted to the first and second support members and being configured to secure the plant cutting; and
    a growth medium mounted to at least one of the support members for contacting the cut end of the plant cutting and promoting growth of the plant cutting within the enclosure upon planting of the device and propagation of roots via the at least one opening in each of the sidewalls to produce a plant clone.

8. The device of claim 7, wherein the cutter comprises a straight-edge blade.

9. The device of claim 7, wherein the cutter comprises a serrated-edge blade.

10. The device of claim 7, wherein the support members comprise a locking mechanism arranged and configured to lock the support members together in the closed position.

11. The device of claim 10, wherein the locking mechanism is unlockable to enable the first and second support members to be moved back to the open position.

12. The device of claim 7, wherein the cutter is mounted in the first support member and the second support member comprises a cutter guide for receiving and supporting the cutter when the support members move to the closed position.

13. The device of claim 7, wherein the device is composed of a biodegradable material.

14. A plant cutting, planting, and cloning device, the device comprising:
    first and second compartments, wherein said first and second compartments define an enclosure when coupled together, wherein each of the first and second compartments comprises a bottom portion, a top portion, and sidewalls extending between the top portion and the bottom portion, and wherein each of the sidewalls comprises at least one opening sized and configured for root propagation therethrough during plant cutting growth; and
    a cutter mounted within the first compartment and configured to cut a plant part to completely separate it from the plant to produce a plant cutting having a cut end when the first and second compartments are coupled together, such that a cut end of the plant cutting is accommodated, held, and grown within the enclosure upon planting of the device and propagation of roots via the at least one opening in each of the sidewalls is promoted to produce a plant clone.

15. The device of claim 14, wherein the cutter is mounted in the first compartment and the second compartment comprises a cutter guide for receiving and supporting the cutter when the compartments are coupled together.

16. The device of claim 14, wherein the first and second compartments are hingedly connected together and pivotable from an open position to a closed position defining the enclosure.

17. The device of claim 14, wherein the cutter comprises a blade that is oriented at angle with respect to a generally vertical orientation of the plant part.

18. The device of claim 14, further comprising a growth medium disposed in the first compartment and/or the second compartment for contacting the cut end of the plant cutting.

19. The device of claim 14, wherein the device is configured for cutting and cloning a *cannabis* plant.

20. The device of claim 1, wherein the device is configured for planting in an aeroponic or hydroponic system or tower.

* * * * *